US012612009B2

(12) United States Patent
Henck

(10) Patent No.: US 12,612,009 B2
(45) Date of Patent: Apr. 28, 2026

(54) VEHICLE HOOD LIFTER AND AIRBAG ASSEMBLY

(71) Applicant: Joyson Safety Systems Acquisition LLC, Auburn Hills, MI (US)

(72) Inventor: Jeremy Henck, White Lake, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 18/965,612

(22) Filed: Dec. 2, 2024

(65) Prior Publication Data

US 2025/0178560 A1      Jun. 5, 2025

Related U.S. Application Data

(60) Provisional application No. 63/608,480, filed on Dec. 11, 2023, provisional application No. 63/604,613, filed on Nov. 30, 2023.

(51) Int. Cl.
| | |
|---|---|
| B60R 21/38 | (2011.01) |
| B60R 21/34 | (2011.01) |
| B60R 21/36 | (2011.01) |

(52) U.S. Cl.
CPC ............. B60R 21/38 (2013.01); B60R 21/36 (2013.01); B60R 2021/346 (2013.01)

(58) Field of Classification Search
CPC .... B60R 21/38; B60R 21/36; B60R 2021/346
See application file for complete search history.

(56) References Cited

U.S. PATENT DOCUMENTS

| | | | | |
|---|---|---|---|---|
| 3,817,263 | A | * | 6/1974 | Bendler ................ B60R 21/272 |
| | | | | 280/736 |
| 5,607,181 | A | * | 3/1997 | Richardson ............. C06B 47/06 |
| | | | | 222/3 |

(Continued)

FOREIGN PATENT DOCUMENTS

| | | | | |
|---|---|---|---|---|
| AU | 164260 | B | 1/1954 | |
| DE | 10116717 | A1 | * 10/2002 | ............. B60R 21/38 |

(Continued)

OTHER PUBLICATIONS

DE10116717A1 translation.*

*Primary Examiner* — Paul N Dickson
*Assistant Examiner* — Shams Dhanani
(74) *Attorney, Agent, or Firm* — Meunier Carlin & Curfman LLC

(57) ABSTRACT

A vehicle hood lifter and airbag assembly according to various implementations includes a housing having a first end, a second end, and a wall extending from the first end to the second end. The wall comprises an inner surface and an outer surface and defines a gas exit orifice disposed between the first end and the second end. The vehicle hood lifter and airbag assembly further includes a piston assembly which is slidably engaged with the inner surface. The vehicle hood lifter and airbag assembly further includes a pressurized gas disposed within a gas chamber. Upon actuation, the pressurized gas is released from the gas chamber causing the piston assembly to move from adjacent the first end to adjacent the second end. The pressurized gas then exits the housing through the gas exit orifice and flows into an airbag which is coupled to the outer surface.

20 Claims, 16 Drawing Sheets

(56)                  References Cited

U.S. PATENT DOCUMENTS

| | | | | |
|---|---|---|---|---|
| 5,884,938 | A * | 3/1999 | Rink | C06B 23/008 |
| | | | | 280/741 |
| 6,942,261 | B2 * | 9/2005 | Larsen | F15B 15/19 |
| | | | | 180/274 |
| 7,232,178 | B2 | 6/2007 | Neal et al. | |
| 7,334,656 | B2 | 2/2008 | Kramarczyk et al. | |
| 7,374,008 | B1 | 5/2008 | Neal et al. | |
| 7,661,496 | B2 | 2/2010 | Schafer | |
| 7,761,209 | B2 | 7/2010 | Morris et al. | |
| 8,267,216 | B2 | 9/2012 | Browne et al. | |
| 8,596,180 | B2 | 12/2013 | Schaefer et al. | |
| 8,770,334 | B2 | 7/2014 | Rick | |
| 9,440,616 | B2 | 9/2016 | Rick | |
| 9,719,533 | B1 | 8/2017 | McCormick et al. | |
| 10,377,426 | B2 | 8/2019 | Leschnik et al. | |
| 10,442,391 | B2 | 10/2019 | Jenny et al. | |
| 2013/0087401 | A1 | 4/2013 | Masih et al. | |
| 2015/0226239 | A1 * | 8/2015 | Wilmot | B60R 21/38 |
| | | | | 91/5 |
| 2020/0047709 | A1 * | 2/2020 | Gunji | B60W 30/08 |

FOREIGN PATENT DOCUMENTS

| | | | | |
|---|---|---|---|---|
| DE | 102004029757 | A1 | 1/2006 | |
| DE | 102011008290 | A1 * | 10/2011 | B60R 21/36 |
| WO | 2007115693 | A1 | 10/2007 | |

* cited by examiner

VEHICLE HOOD LIFTER AND AIRBAG ASSEMBLY

CROSS REFERENCE TO RELATED APPLICATIONS

This application claims priority to U.S. Provisional Application No. 63/604,613, filed Nov. 30, 2023, entitled "Vehicle Hood Lifter and Airbag Assembly," and U.S. Provisional Application No. 63/608,480, filed Dec. 11, 2023, entitled "Vehicle Hood Lifter and Airbag Assembly," which are both incorporated herein by reference in their entirety.

TECHNICAL FIELD

The present disclosure relates to safety devices for passenger vehicles. In particular, the disclosure relates to a vehicle hood lifter and airbag assembly. Passenger vehicles may include, for example, automobiles.

BACKGROUND

A vehicle hood lifter may be used, for example on an automobile, for lifting at least a portion of a vehicle hood (e.g., a rear portion of the hood proximate a windshield) in a situation where the vehicle collides with a pedestrian. When actuated, the hood lifter raises the hood portion from its normal rest position to an elevated position so that the pedestrian may be kept from impacting the rigid components under the vehicle hood (e.g., an engine). In typical automobiles, a hood lifter may be installed on both lateral sides of the vehicle so that the hood portion is raised evenly across the width of the vehicle.

Alternatively or additionally, an A-pillar and/or windshield airbag may be used to cushion the impact of the pedestrian's head and upper body during a collision. When used in combination with a hood lifter, the risk of serious injury to the pedestrian is reduced. However, installing both devices individually increases the complexity of the actuation process, resulting in more possibilities for errors. Therefore, there is a need for a combined vehicle hood lifter and airbag assembly that can perform both functions with a single device using a single actuation process. In addition to improved safety, the combined assembly can be lower cost and smaller in size, increasing the likelihood that original equipment manufacturers will incorporate such devices in their vehicles.

SUMMARY

According to various implementations, a vehicle hood lifter and airbag assembly comprises a housing comprising a first end, a second end, and a wall extending from the first end to the second end. The wall comprises an inner surface and an outer surface and defines a gas exit orifice disposed between the first end and the second end of the housing, wherein the gas exit orifice extends from the inner surface to the outer surface of the wall. A piston assembly is slidably engaged with the inner surface of the housing, wherein the piston assembly comprises a piston and a piston rod. A pressurized gas is disposed within a gas chamber and an airbag is coupled to the outer surface of the wall. Upon actuation of the vehicle hood lifter and airbag assembly, the pressurized gas is released from the gas chamber causing the piston to move from adjacent the first end to adjacent the second end of the housing. The pressurized gas then exits the housing through the gas exit orifice and flows into the airbag when the piston is between the second end of the housing and the gas exit orifice.

In some implementations, the piston rod defines the gas chamber and an actuator is coupled to the first end of the housing. The piston defines a piston channel extending from a first end of the piston to a second end of the piston, wherein the piston channel allows fluid communication between the gas chamber and an actuation chamber disposed between the first end of the piston and the actuator. A burst seal prevents fluid communication between the gas chamber and the actuation chamber prior to actuation of the vehicle hood lifter and airbag assembly, wherein the burst seal is coupled to the piston adjacent the second end of the piston. Upon actuation of the vehicle hood lifter and airbag assembly, the actuator breaks the burst seal causing the pressurized gas to exit the gas chamber through the piston channel and enter the actuation chamber thereby causing the piston to move from adjacent the first end of the housing to adjacent the second end of the housing.

In some implementations, the housing is a first housing and the vehicle hood lifter and airbag assembly further comprises a second housing, wherein the second housing comprises a first end and a second end. The second end of the second housing is coupled to the first end of the first housing, and the second housing defines the gas chamber. A connector is disposed between the second housing and the first housing and couples the second housing to the first housing. The connector comprises a channel and a burst seal, wherein the channel of the connector is in fluid communication with the first housing and the burst seal prevents fluid communication between the channel and the gas chamber prior to actuation. The vehicle hood lifter and airbag assembly further comprises an actuator coupled to the first end of the second housing. Upon actuation of the vehicle hood lifter and airbag assembly, the actuator generates a shockwave that travels through the pressurized gas from the first end of the second housing to the burst seal of the connector, breaking the burst seal which allows the pressurized gas to flow from the gas chamber through the channel of the connector and into the first housing.

According to various implementations, a vehicle hood lifter and airbag assembly comprises a housing defining a gas chamber and comprising an outer surface, a first end, and a second end. A sleeve is slidably engaged with the outer surface of the housing and comprises a third end, a fourth end, and a wall extending from the third end to the fourth end. The wall comprises an inner surface and an outer surface and defines a gas exit orifice disposed between the third end and the fourth end, wherein the gas exit orifice extends from the inner surface to the outer surface of the wall. A pressurized gas is disposed within the gas chamber and an airbag is coupled to the outer surface of the sleeve. Upon actuation of the vehicle hood lifter and airbag assembly, the pressurized gas is released from the gas chamber causing the sleeve to slide along the outer surface of the housing from a first position to a second position. The pressurized gas then exits the vehicle hood lifter and airbag assembly through the gas exit orifice and flows into the airbag when the sleeve is in the second position.

BRIEF DESCRIPTION OF THE DRAWINGS

The drawings are merely exemplary to illustrate certain features that can be used singularly or in combination with other features. The disclosure should not be limited to the implementations shown.

DETAILED DESCRIPTION

The devices, systems, and methods disclosed herein provide for a vehicle hood lifter and airbag assembly. The assembly can be used in automobiles for lifting the hood of the vehicle and filling an airbag adjacent the vehicle A-pillar and/or windshield, both of which helps to cushion the impact of a pedestrian with the vehicle. The vehicle hood lifter and airbag assembly includes a housing having a first end, a second end, and a wall extending from the first end to the second end. The wall comprises an inner surface and an outer surface and defines a gas exit orifice disposed between the first end and the second end. A piston assembly is slidably engaged with the inner surface. The vehicle hood lifter and airbag assembly further includes a pressurized gas disposed within a gas chamber. Upon actuation, the pressurized gas is released from the gas chamber causing the piston assembly to move from adjacent the first end to adjacent the second end. The pressurized gas then exits the housing through the gas exit orifice and flows into an airbag which is coupled to the outer surface.

The devices, systems, and methods disclosed herein also provide for a vehicle hood lifter and airbag assembly. The assembly can be used in automobiles for lifting the hood of the vehicle and filling an airbag adjacent the vehicle A-pillar and/or windshield, both of which helps to cushion the impact of a pedestrian with the vehicle. The vehicle hood lifter and airbag assembly includes a housing having a first end, a second end, and an outer surface. A sleeve is slidably engaged with the outer surface. The sleeve comprises a third end, a fourth end, and a wall extending from the third end to the fourth end. The wall comprises an inner surface and an outer surface and defines a gas exit orifice disposed between the third end and the fourth end and extending from the inner surface to the outer surface of the sleeve. The vehicle hood lifter and airbag assembly further includes a pressurized gas disposed within a gas chamber. Upon actuation, the pressurized gas is released from the gas chamber causing the sleeve to slide along the outer surface of the housing from a first position to a second position. The pressurized gas then exits the assembly through the gas exit orifice and flows into an airbag which is coupled to the outer surface of the sleeve.

Figure 1A:
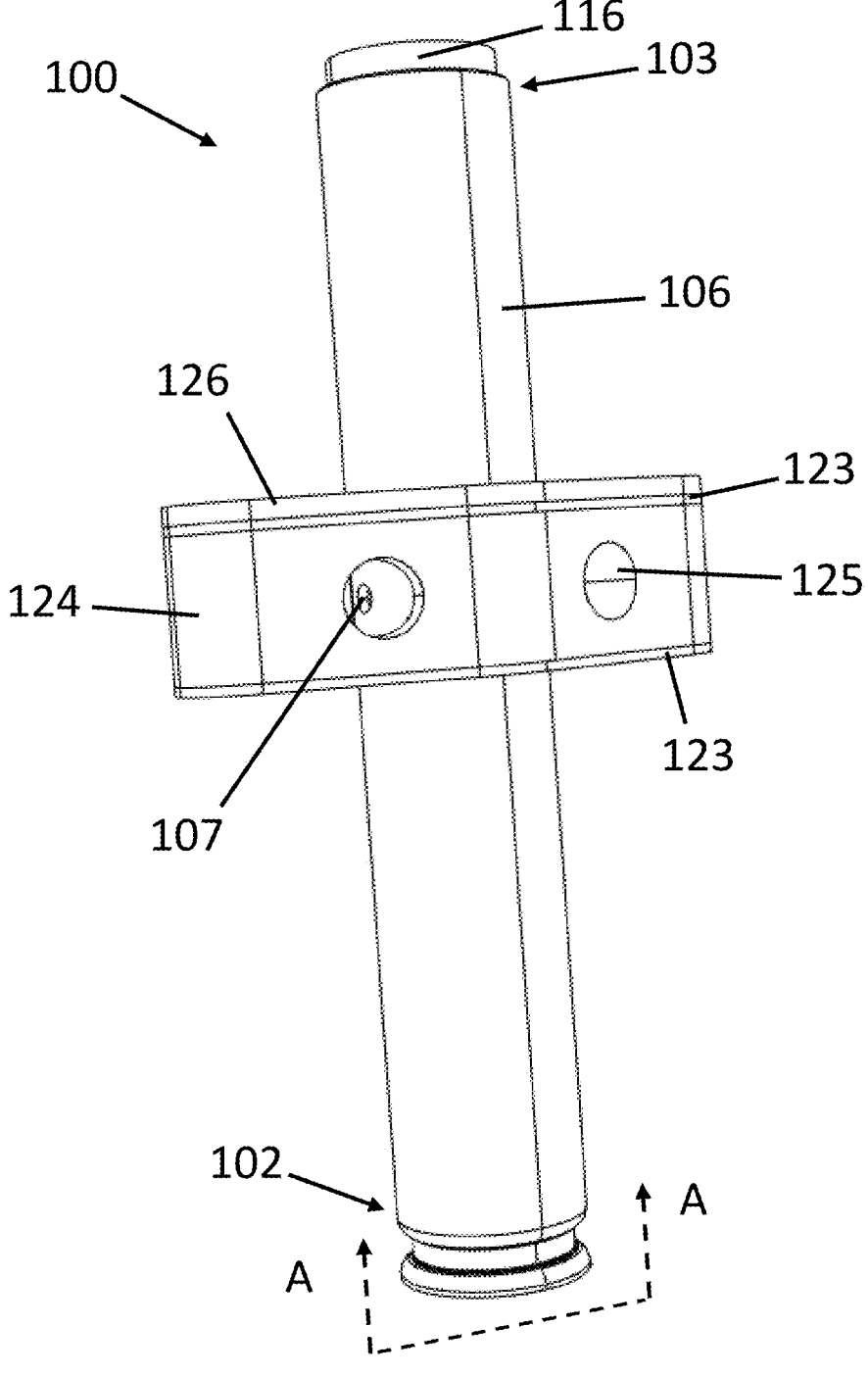
FIG. 1A is a perspective view of a first implementation of a vehicle hood lifter and airbag assembly.
Figure 1B:
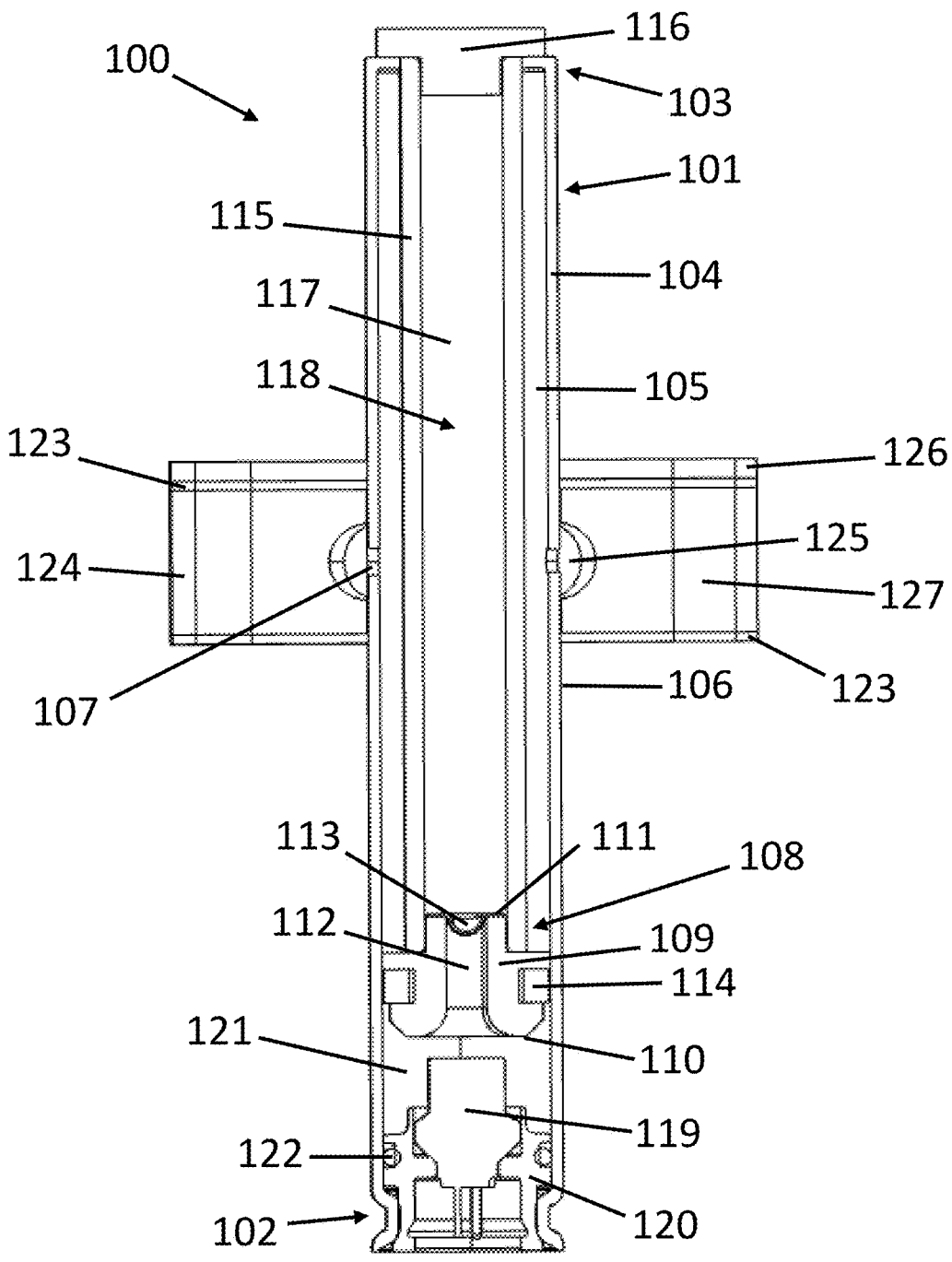
FIG. 1B is a cross-sectional view of the vehicle hood lifter and airbag assembly of FIG. 1A taken through the line A-A.
Figure 1C:
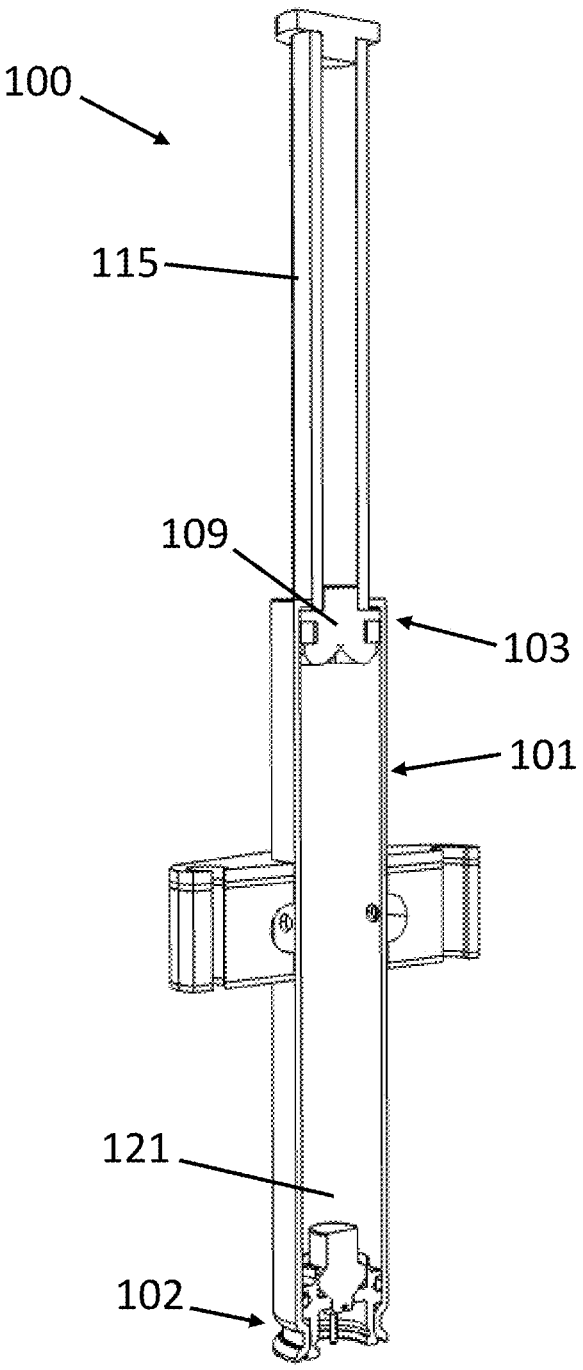
FIG. 1C is a perspective view of the vehicle hood lifter and airbag assembly of FIG. 1B in an actuated state.

As shown in FIGS. 1A-1C, a first implementation of a vehicle hood lifter and airbag assembly 100 comprises a housing 101 comprising a first end 102, a second end 103, and a wall 104 extending from the first end 102 to the second end 103. The wall 104 comprises an inner surface 105 and an outer surface 106. The wall 104 defines at least one gas exit orifice 107 disposed between the first end 102 and the second end 103. In the implementation shown in FIGS. 1A-1C, two gas exit orifices 107 are defined. However, in other implementations, any number of gas exit orifices may be used as needed for the contemplated use case. The housing 101 is preferably made from stainless steel, however other materials may be used insofar as they provide the appropriate characteristics for a given use case, such as carbon steel, aluminum, or high strength plastics. The housing 101 may be formed via a deep drawing process as known in the art.

A piston assembly 108 is slidably engaged with the inner surface 105 of the housing 101, such that the piston assembly 108 may slide from adjacent the first end 102 of the housing 101 (pre-actuated state, FIG. 1B) to adjacent the second end 103 of the housing 101 (actuated state, FIG. 1C). The piston assembly 108 comprises a piston 109, a piston rod 115, and a striker 116. As shown in FIGS. 1B-1C, the piston 109, piston rod 115, and striker 116 may be separately formed and coupled together. The piston 109, piston rod 115, and striker 116 are preferably made from stainless steel, however other materials may be used insofar as they provide the appropriate characteristics for a given use case, such as carbon steel, aluminum, or high strength plastics. Piston rod 115 is a hollow, tubular structure and defines a gas chamber 117 in which a pressurized gas 118 is stored.

Pressurized gas 118 may be a 50:50 (molar ratio) helium/argon mix that is pressurized to a level of approximately 39.2 to 43.6 MPa and sealed within the gas chamber 117. The 50:50 helium/argon mix may be loaded at a mass of approximately 7.08 to 37.0 grams to constitute 0.33 to 1.65 mols of total gas. In other implementations, the pressurized gas may be a different helium/argon mix (e.g., 80:20 molar ratio), nitrogen, other inert gas, or combinations of inert gases, and may be stored at any pressure and mass level necessary to support the given use case. The pressurized gas 118 may be loaded and sealed into the piston rod 115 using a ball fill process as known in the art, or by using any other process known in the art.

Piston 109 defines a piston channel 112 extending from a first end 110 of the piston 109 to a second end 111 of the piston 109. A burst seal 113, such as a thin piece of metal or other membrane, such as steel, aluminum, or plastic, is coupled to the piston 109 and covers the piston channel 112 at the second end 111 so that the pressurized gas 118 remains sealed within the gas chamber 117 in the pre-actuated state (striker 116 seals the gas chamber 117 on the opposite end of the piston rod 115 via a welded connection, for example). To enable a transition from the pre-actuated state to the actuated state, an actuator 119 is coupled to the housing 101 at the first end 102. For example, the actuator 119 may be an initiator, or other micro gas generator known in the pyro-technic arts, coupled to an actuator housing 120 which is crimped into the housing 101. An actuator housing seal 122, such as a rubber o-ring, is installed around the actuator housing 120 to maintain a seal between the actuator housing 120 and the inner surface 105 of the housing 101.

An actuation chamber 121 is formed between the actuator 119 and the first end 110 of the piston 109. The piston channel 112 therefore allows fluid communication between the gas chamber 117 and the actuation chamber 121 in the actuated state. However, prior to actuation, i.e., in the pre-actuated state, the burst seal 113 prevents fluid communication between the gas chamber 117 and the actuation chamber 121. When the vehicle hood lifter and airbag assembly 100 is actuated, the actuator 119 produces gas and heat in the actuator chamber 121 which rapidly increases the pressure in the actuation chamber 121 and the piston channel 112, resulting in the breaking of the burst seal 113. Once the burst seal 113 is broken, the pressurized gas 118 exits the gas chamber 117 through the piston channel 112 and enters the actuation chamber 121. This movement of the pressurized gas 118 generates thrust and therefore causes the piston 109 to move from adjacent the first end 102 of the housing 101 (as shown in FIG. 1B) to adjacent the second end 103 of the housing 101 (as shown in FIG. 1C, wherein the actuation chamber 121 has grown in volume due to the movement of the piston 109).

Figure 2A:
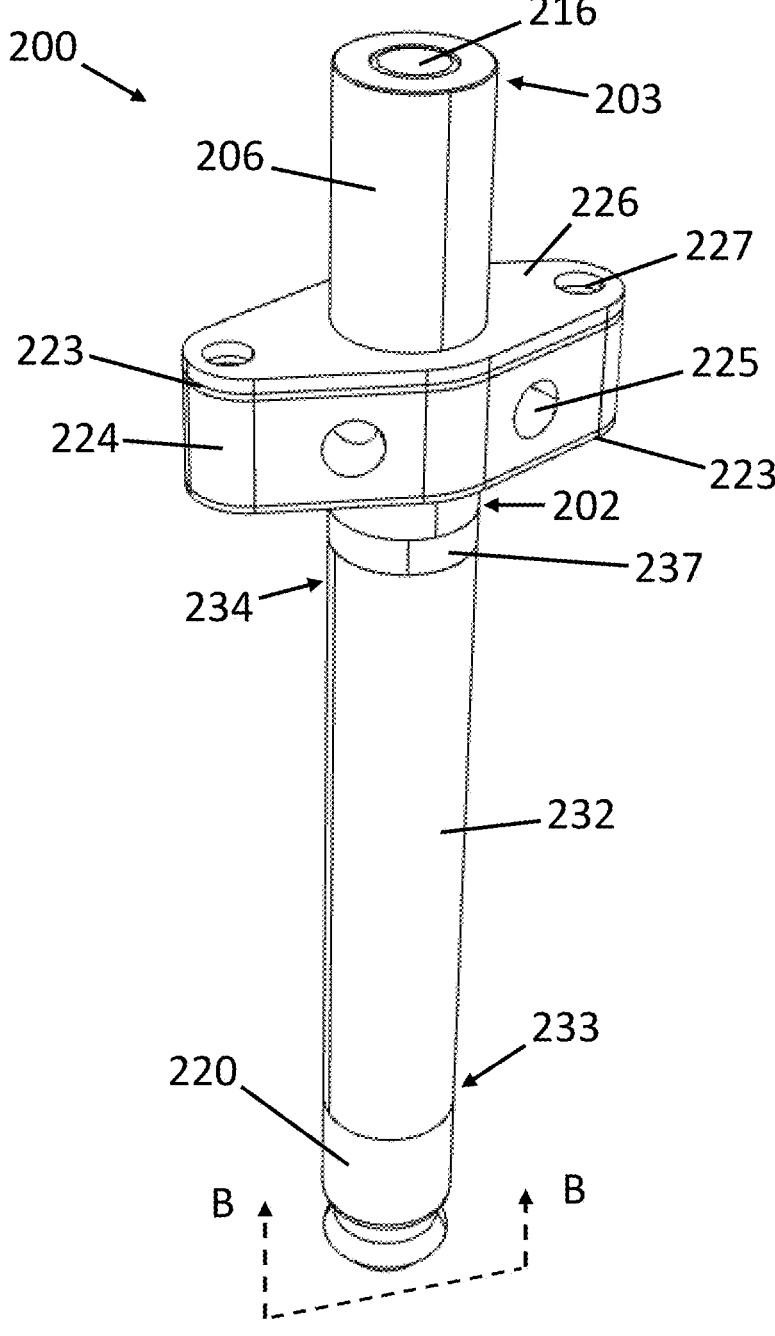
FIG. 2A is a perspective view of a second implementation of the vehicle hood lifter and airbag assembly.
Figure 2B:
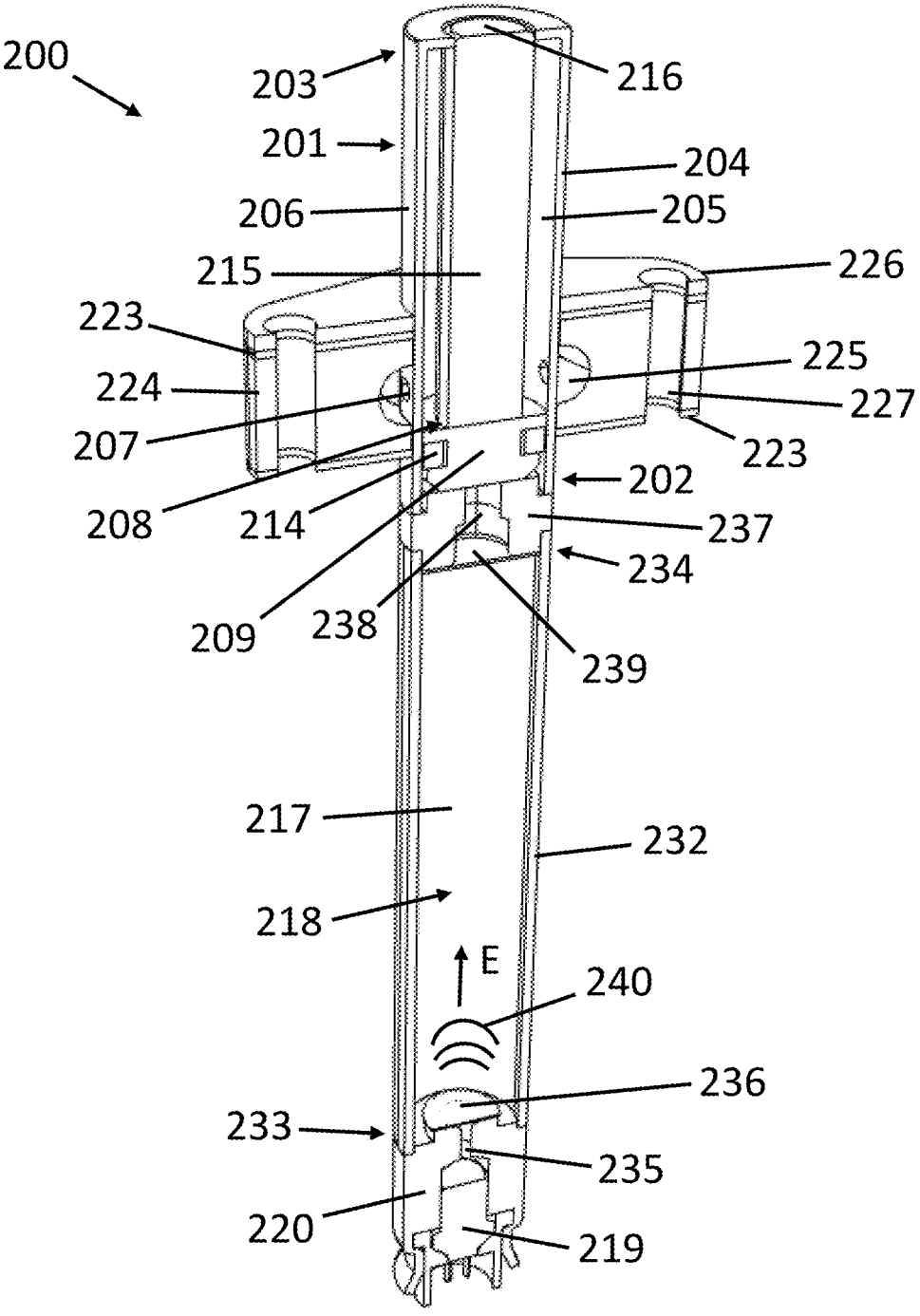
FIG. 2B is a cross-sectional view of the vehicle hood lifter and airbag assembly of FIG. 2A taken through the line B-B.
Figure 2C:
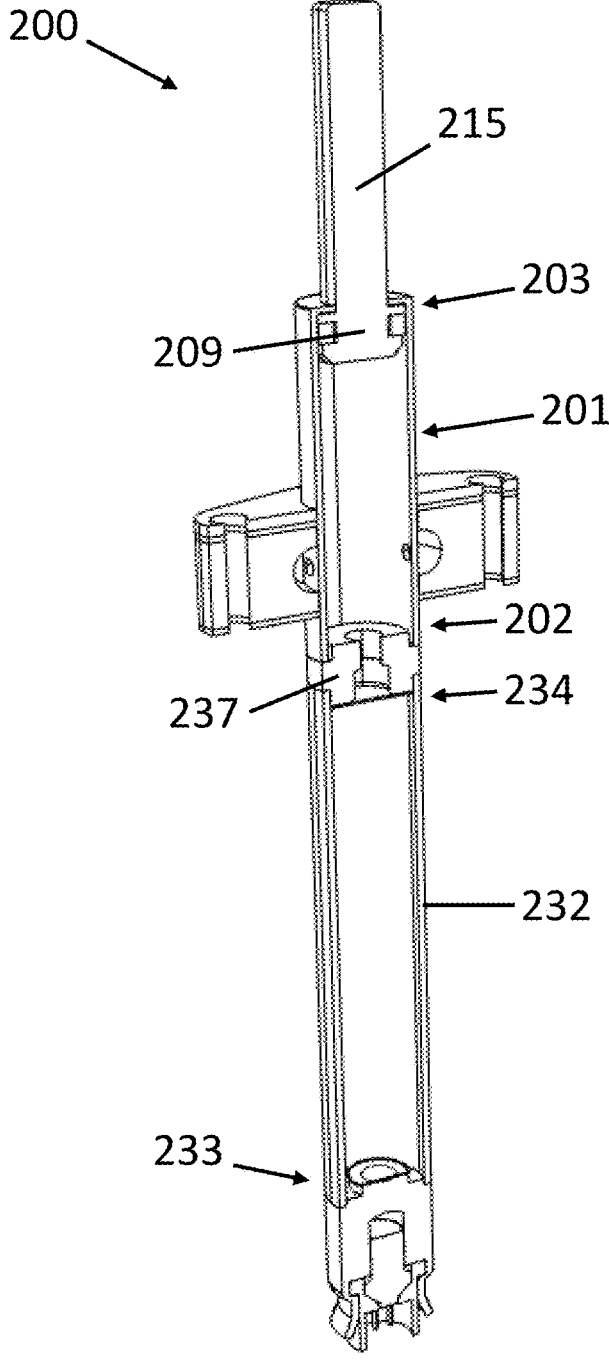
FIG. 2C is a perspective view of the vehicle hood lifter and airbag assembly of FIG. 2B in an actuated state.

Referring now to FIGS. 2A-2C, a second implementation of a vehicle hood lifter and airbag assembly 200 comprises a first housing 201 comprising a first end 202, a second end 203, and a wall 204 extending from the first end 202 to the second end 203. The wall 204 comprises an inner surface 205 and an outer surface 206. The wall 204 defines at least one gas exit orifice 207 disposed between the first end 202 and the second end 203. In the implementation shown in FIGS. 2A-2C, two gas exit orifices 207 are defined. However, in other implementations, any number of gas exit orifices may be used as needed for the contemplated use case. The housing 201 is preferably made from stainless steel, however other materials may be used insofar as they provide the appropriate characteristics for a given use case, such as carbon steel, aluminum, or high strength plastics. The first housing 201 may be formed via a deep drawing process as known in the art.

A piston assembly 208 is slidably engaged with the inner surface 205 of the first housing 201, such that the piston assembly 208 may slide from adjacent the first end 202 of the first housing 201 (pre-actuated state, FIG. 2B) to the second end 203 of the first housing 201 (actuated state, FIG. 2C). The piston assembly 208 comprises a piston 209, a piston rod 215, and a striker 216. As shown in FIGS. 2B-2C, the piston 209, piston rod 215, and striker 216 may be integrally formed together. Piston rod 215 is a solid structure and the striker 216 is defined as an end surface of the piston rod 215. The piston assembly 208 is preferably made from stainless steel, however other materials may be used insofar as they provide the appropriate characteristics for a given use case, such as carbon steel, aluminum, or high strength plastics.

A second housing 232 comprises a first end 233 and a second end 234. The second housing 232 is coupled to the first housing 201 via a connector 237 disposed between the first housing 201 and the second housing 232, wherein the first end 202 of the first housing 201 is coupled to the connector 237 and the second end 234 of the second housing 232 is coupled to the connector 237. The second housing 232 and connector 237 are preferably made from stainless steel, however other materials may be used insofar as they provide the appropriate characteristics for a given use case, such as carbon steel, aluminum, or high strength plastics. The second housing 232 may be formed via a deep drawing process as known in the art. The second housing 232 is a hollow, tubular structure and defines a gas chamber 217 in which a pressurized gas 218 is stored.

Pressurized gas 218 may be a 50:50 (molar ratio) helium/argon mix that is pressurized to a level of approximately 39.2 to 43.6 MPa and sealed within the gas chamber 217. The 50:50 helium/argon mix may be loaded at a mass of approximately 7.08 to 37.0 grams to constitute 0.33 to 1.65 mols of total gas. In other implementations, the pressurized gas may be a different helium/argon mix (e.g., 80:20 molar ratio), nitrogen, other inert gas, or combinations of inert gases, and may be stored at any pressure and mass level necessary to support the given use case. The pressurized gas 218 may be loaded and sealed into the second housing 232 using a ball fill process as known in the art, or by using any other process known in the art.

To seal the gas chamber 217 at the second end 234 of the second housing 232, the connector 237 comprises a burst seal 239 and a channel 238. The channel 238 allows for fluid communication between the first housing 201 and the gas chamber 217 of the second housing 232 in the actuated state whereas the burst seal 239 blocks fluid communication in the pre-actuated state. Sealing the gas chamber 217 at the first end 233 of the second housing 232 is an actuator housing 220. As shown in FIG. 2B, the actuator housing 220 may be welded to the second housing 232. The actuator housing 220 comprises a channel 235 and a burst seal 236 which prevents fluid communication between the channel 235 and the gas chamber 217 in the pre-actuated state. An actuator 219 is coupled to the actuator housing 220 and is in fluid communication with the channel 235.

Upon actuation of the vehicle hood lifter and airbag assembly 200, the actuator 219 produces gas and heat in the channel 235 which rapidly increases the pressure in the channel 235, resulting in the breaking of the burst seal 236. Once the burst seal 236 is broken, the movement of the high-pressure gas from the channel 235 into the gas chamber 217 generates a shockwave 240 that travels through the pressurized gas 218 from the first end 233 of the second housing 232 to the burst seal 239 of the connector 237 in the direction E. The shockwave breaks the burst seal 239, allowing the pressurized gas 218 to flow from the gas chamber 217 through the channel 238 of the connector 237 and into the first housing 201. The pressurized gas 218 pushes against the piston 209 to move the piston 209 from adjacent the first end 202 of the first housing 201 (as shown in FIG. 2B) to adjacent the second end 203 of the first housing 201 (as shown in FIG. 2C).

Referring now to FIGS. 1A-1C and 3A-3B, an airbag 123 is coupled to the outer surface 106 of the housing 101 adjacent the gas exit orifices 107. As the piston 109 moves from adjacent the first end 102 of the housing 101 to adjacent the second end 103 of the housing 101, the piston 109 will pass by the gas exit orifices 107 such that the piston 109 is located between the second end 103 and the gas exit orifices 107. At this point, the pressurized gas 118 exits the housing 101 through the gas exit orifices 107 and flows into the airbag 123, thereby inflating it. Prior to this point, a piston seal 114, e.g., a rubber o-ring, prevents the pressurized gas 118 from passing between the inner surface 105 of the housing 101 and the piston 109.

Figure 3A:
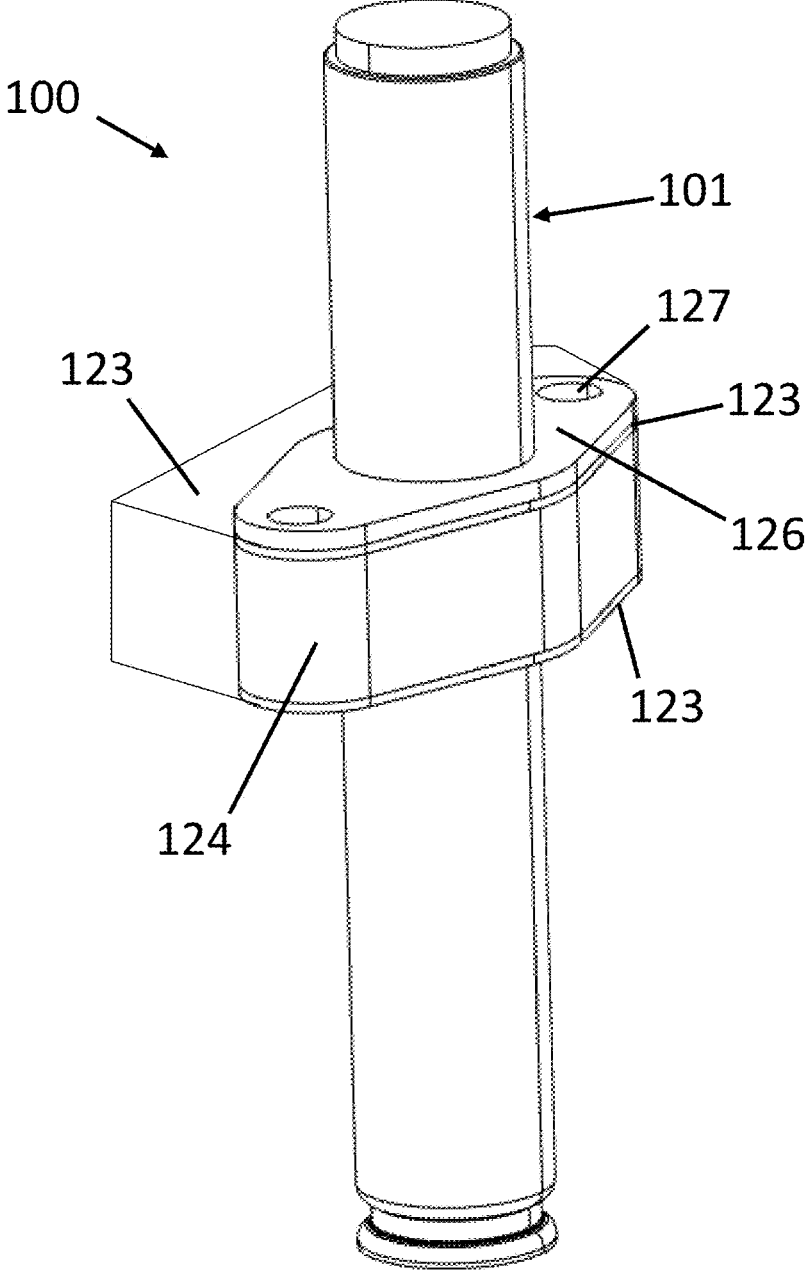
FIG. 3A is a perspective view of the vehicle hood lifter and airbag assembly of FIG. 1A with an airbag in a pre-actuated state.
Figure 3B:
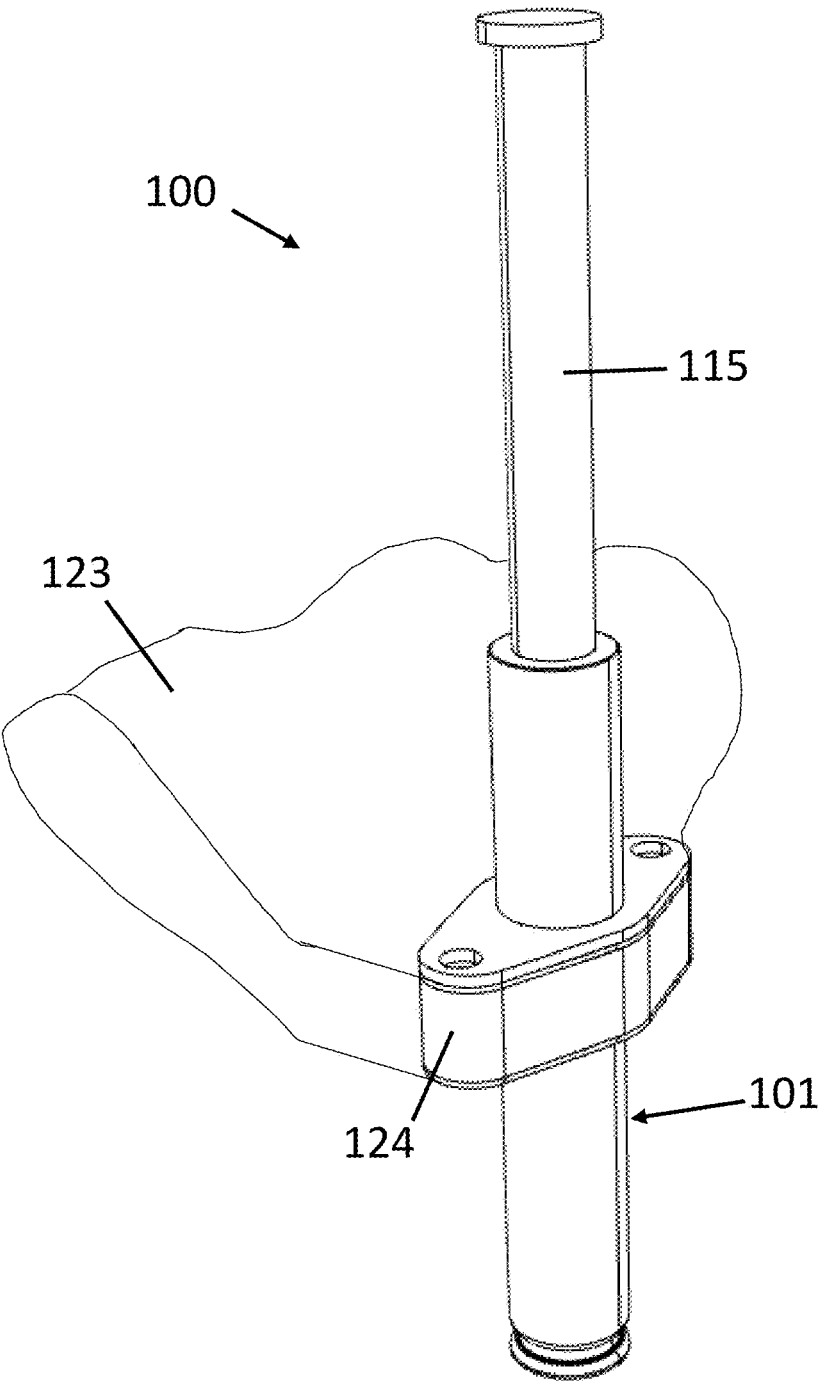
FIG. 3B is a perspective view of the vehicle hood lifter and airbag assembly of FIG. 3A in an actuated state.

A diffuser 124 may be used which defines a gas diffusing channel 125. The diffuser 124 may be clamped between two layers of the airbag 123 such that it is disposed at least partially within the airbag 123, for example using a fastener (not shown), such as a nut and bolt, installed through a fastener opening 127. The fastener opening 127 passes through a mounting bracket 126, the airbag 123, and the diffuser 124 such that they all may be clamped tightly together, preventing gas leakage. The mounting bracket 126 is similarly coupled to the outer surface 106 of the housing 101 such that the entire assembly 100 may be mounted to a vehicle. The gas diffusing channel 125 is designed to direct the pressurized gas 118 exiting the gas exit orifices 107 into the airbag 123 in the preferred deployment direction. For example, as shown in FIGS. 3A-3B, the airbag 123 may be folded or otherwise packaged substantially on one side of the housing 101, such that is deploys away from the housing 101 when the assembly 100 is actuated.

Similarly, as shown in FIGS. 2A-2C, an airbag 223 is coupled to the outer surface 206 of the first housing 201 adjacent the gas exit orifices 207. As the piston 209 moves from adjacent the first end 202 of the first housing 201 to adjacent the second end 203 of the first housing 201, the piston 209 will pass by the gas exit orifices 207 such that the piston 209 is located between the second end 203 of the first housing 201 and the gas exit orifices 207. At this point, pressurized gas 218 exits the first housing 201 through the gas exit orifices 207 and flows into the airbag 223, thereby inflating it. Prior to this point, a piston seal 214, e.g., a rubber o-ring, prevents the pressurized gas 218 from passing between the inner surface 205 of the first housing 201 and the piston 209. The assembly 200 further comprises a diffuser 224, having a gas diffusing channel 235, which is disposed at least partially within the airbag 223. A mounting bracket 226, the airbag 223, and the diffuser 224 are all arranged similarly as discussed above and are clamped together using a fastener installed through a fastener opening 227.

Figure 4:
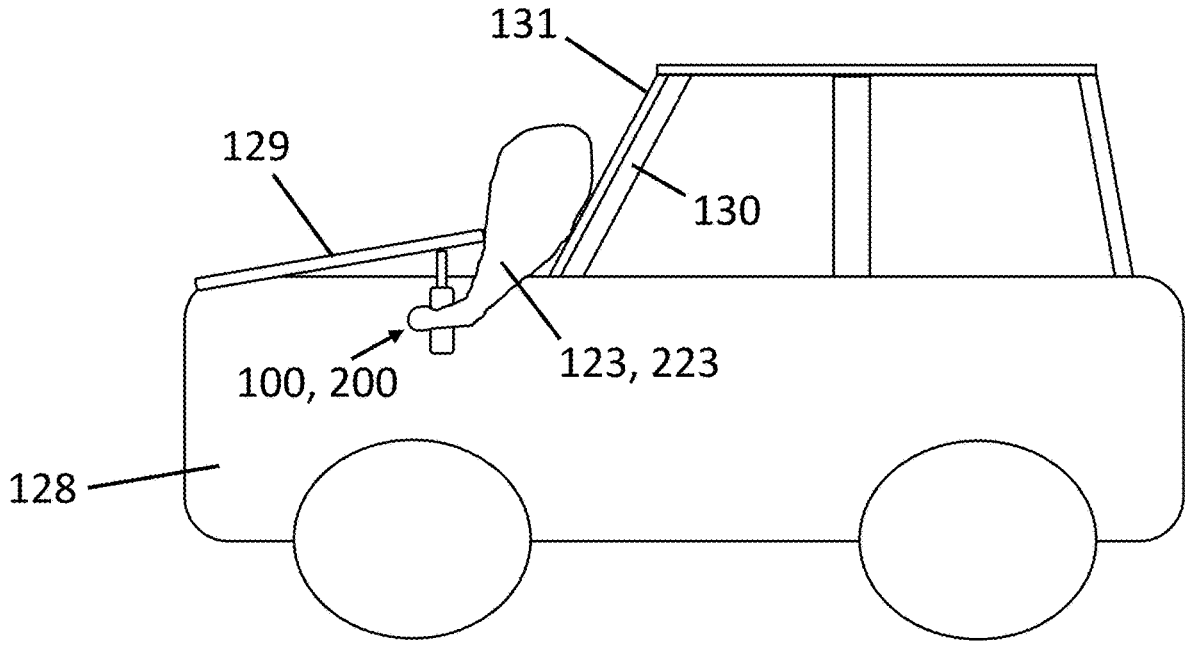
FIG. 4 is a side view of an automobile showing the vehicle hood lifter and airbag assembly in an actuated state.

Referring now to FIG. 4, a vehicle 128, for example an automobile, comprises a hood 129, an A-pillar 130, and a windshield 131. The vehicle hood lifter and airbag assembly 100/200 is installed within the engine compartment of the vehicle 128 such that, in the actuated state, the piston rod 115/215 (via the striker 116/216) pushes against the hood 129 to raise the hood 129 as the piston 109/209 moves from adjacent the first end 102/202 of the housing 101/201 to adjacent the second end 103/203 of the housing 101/201. The airbag 123/223 then deploys to a position adjacent the A-pillar 130 and/or the windshield 131.

Figure 5A:
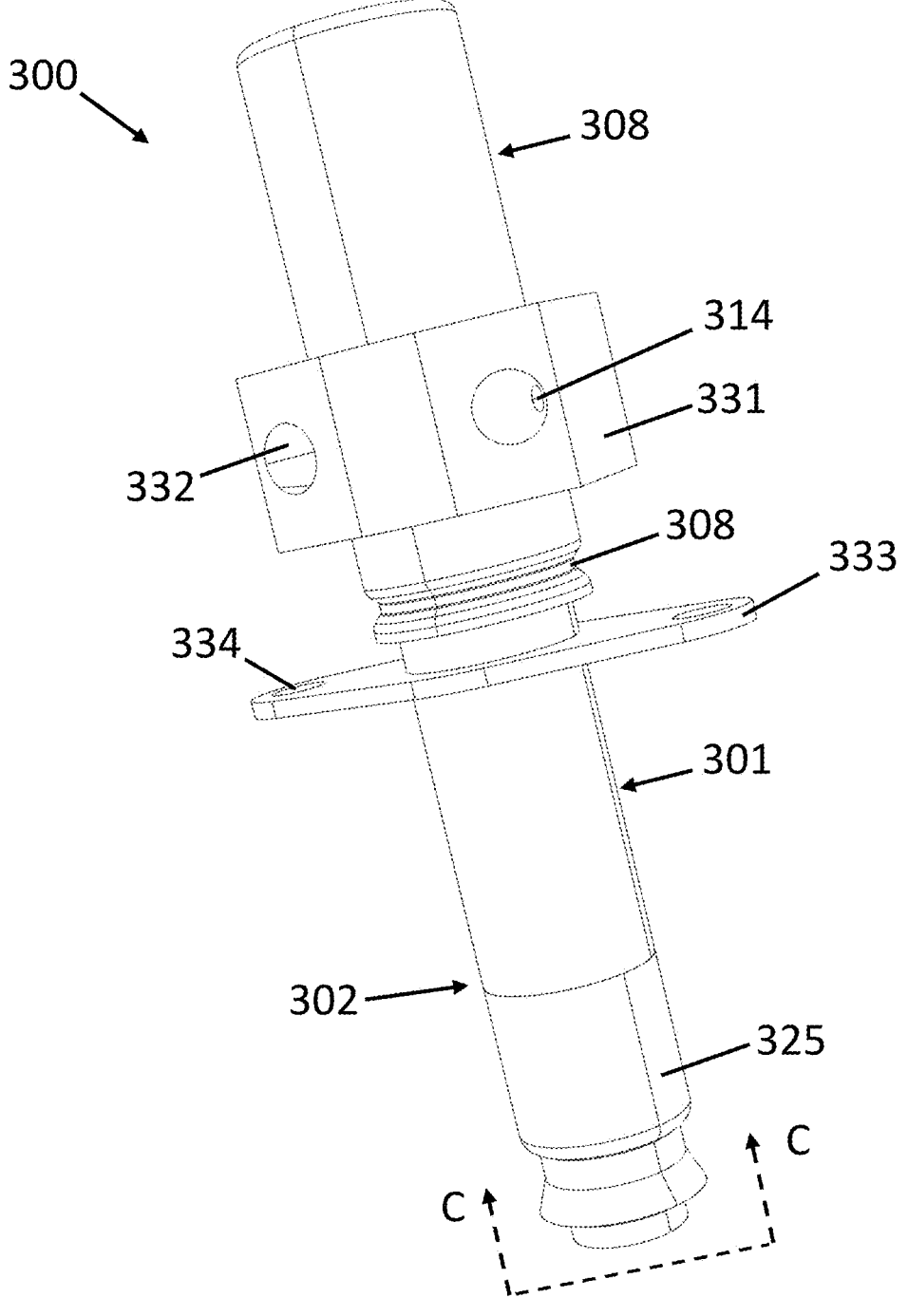
FIG. 5A is a perspective view of a third implementation of a vehicle hood lifter and airbag assembly.
Figure 5B:
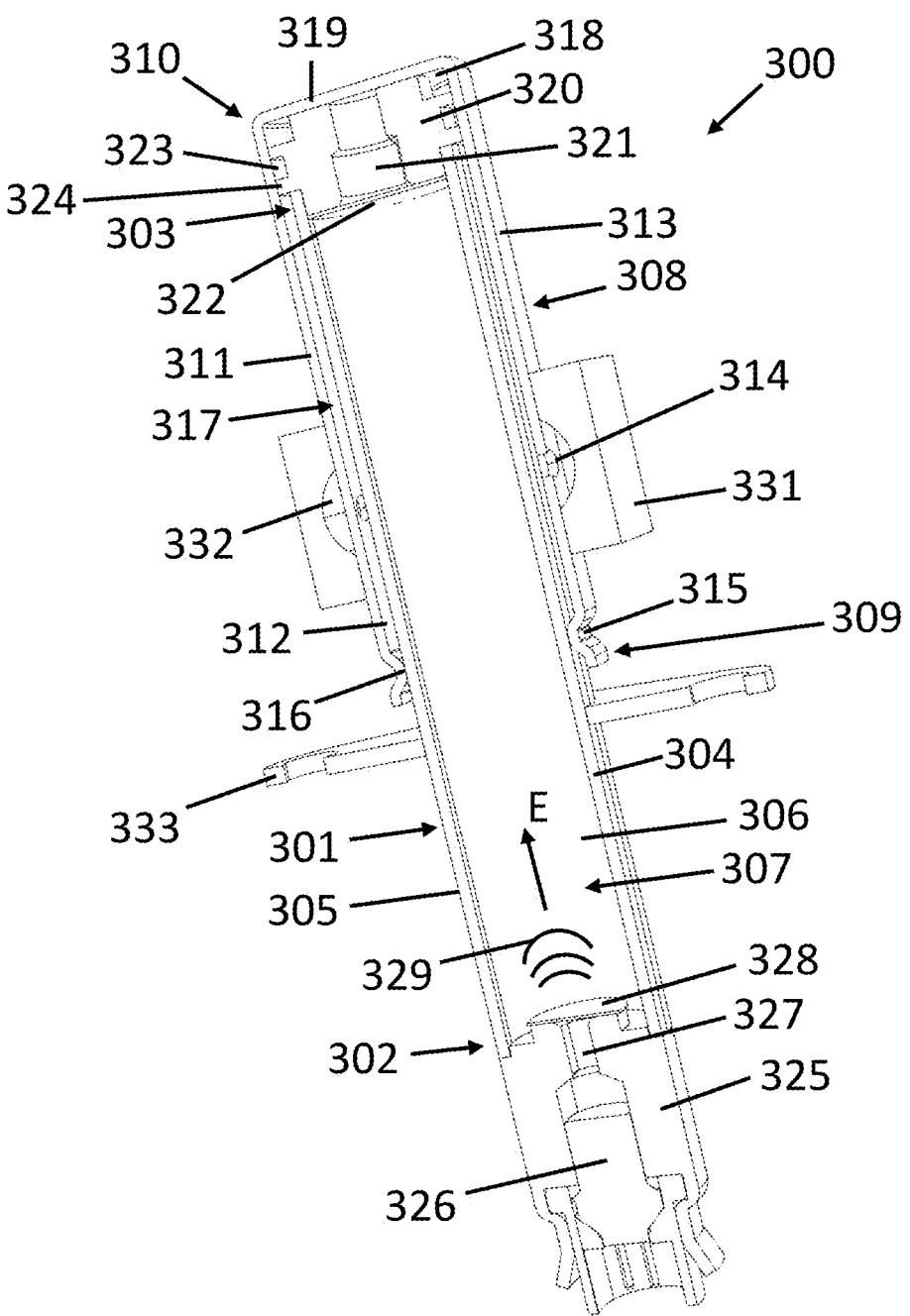
FIG. 5B is a cross-sectional view of the vehicle hood lifter and airbag assembly of FIG. 5A taken through the line C-C.

As shown in FIGS. 5A-5B, a third implementation of a vehicle hood lifter and airbag assembly 300 comprises a housing 301 comprising a first end 302, a second end 303, and a wall 304 extending from the first end 302 to the second end 303. The wall 304 comprises an outer surface 305. Housing 301 is a hollow, tubular structure and defines a gas chamber 306 in which a pressurized gas 307 is stored. The housing 301 is preferably made from stainless steel, however other materials may be used insofar as they provide the appropriate characteristics for a given use case, such as carbon steel, aluminum, or high strength plastics. The housing 301 may be formed via a deep drawing process as known in the art.

Pressurized gas 307 may be a 50:50 (molar ratio) helium/argon mix that is pressurized to a level of approximately 39.2 to 43.6 MPa and sealed within the gas chamber 306. The 50:50 helium/argon mix may be loaded at a mass of approximately 7.08 to 37.0 grams to constitute 0.33 to 1.65 mols of total gas. In other implementations, the pressurized gas may be a different helium/argon mix (e.g., 80:20 molar ratio), nitrogen, other inert gas, or combinations of inert gases, and may be stored at any pressure and mass level necessary to support the given use case. The pressurized gas 307 may be loaded and sealed into the gas chamber 306 using a ball fill process as known in the art, or by using any other process known in the art.

A sleeve 308 comprises a third end 309, a fourth end 310, and a wall 311 extending from the third end 309 to the fourth end 310. The wall 311 comprises an inner surface 312 and an outer surface 313 and defines a gas exit orifice 314 disposed between the third end 309 and the fourth end 310, the gas exit orifice 314 extending from the inner surface 312 to the outer surface 313 of the wall 311. In the implementation shown in the FIGURES, two gas exit orifices 314 are defined. However, in other implementations, any number of gas exit orifices may be used as needed for the contemplated use case (e.g., one, four, or eight). The sleeve 308 is slidably engaged with the outer surface 305 of the housing 301, such that the sleeve 308 may slide along the outer surface 305 of the housing 301 when the pressurized gas 307 pushes against the fourth end 310 via a pushing surface 318 located at the fourth end 310, thereby moving the sleeve from a first position to a second position. The sleeve 308 is preferably made from stainless steel, however other materials may be used insofar as they provide the appropriate characteristics for a given use case, such as carbon steel, aluminum, or high strength plastics. The sleeve 308 may be formed via a deep drawing process as known in the art.

A connector 320 is disposed between the housing 301 and the sleeve 308, wherein the connector 320 comprises a channel 321 and a burst seal 322. For example, the connector 320 may be coupled to the housing 301 (e.g., welded or threaded) at the second end 303. The sleeve 308 is disposed around the connector 320 and a portion of the housing 301 such that a plenum 317 is formed between the inner surface 312 of the sleeve 308 and the outer surface 305 of the housing 301 in an unactuated state (i.e., the first position, shown in FIGS. 5A-5B). In the first position, the pushing surface 318 is adjacent the connector 320. In the implementation shown in FIG. 5B, the pushing surface 318 abuts the connector 320 in the first position. The connector 320 is preferably made from stainless steel, however other materials may be used insofar as they provide the appropriate characteristics for a given use case, such as carbon steel, aluminum, or high strength plastics. The connector 320 may be formed a machining process or stamping process, or any other appropriate process as known in the art.

Figure 6A:
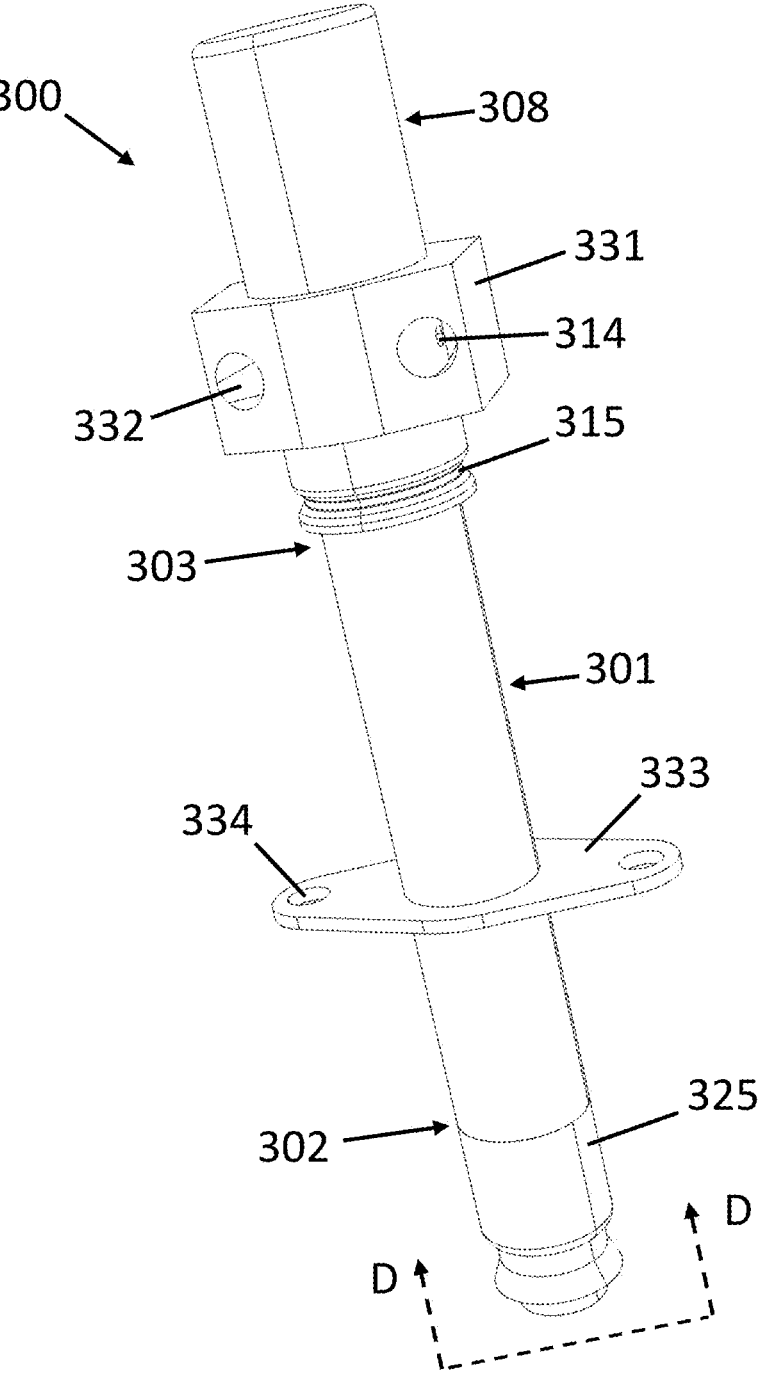
FIG. 6A is a perspective view of the vehicle hood lifter and airbag assembly of FIG. 5A in an actuated state.
Figure 6B:
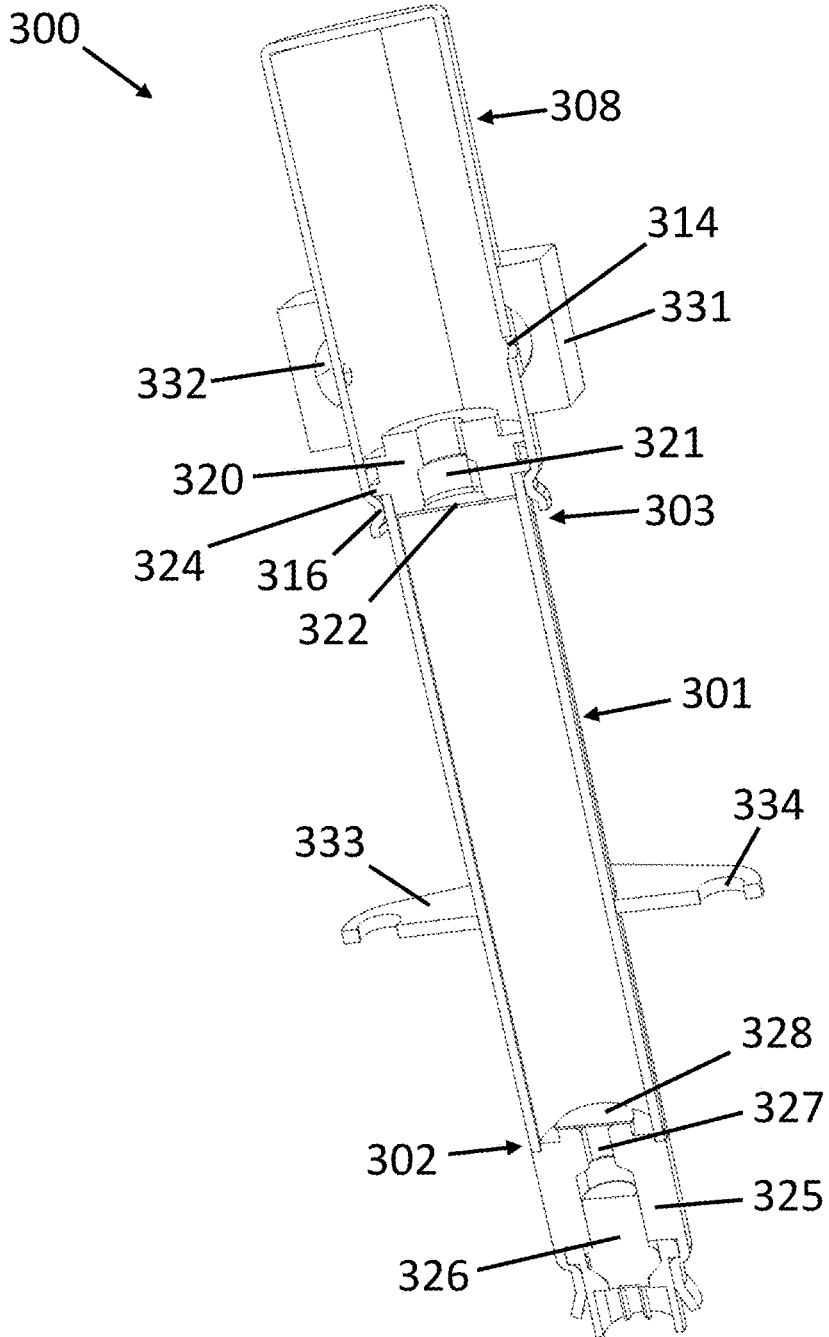
FIG. 6B is a cross-sectional view of the vehicle hood lifter and airbag assembly of FIG. 6A taken through the line D-D.

To ensure the sleeve 308 is permanently and slidably engaged with the housing 301, a protrusion 316 is formed by a crimped portion 315 of the wall 311 (e.g., via crimping process). The protrusion 316 extends radially from the inner surface 312 of the wall 311 to the outer surface 305 of the housing 301. The connector further comprises a flange 324 that extends radially from the connector 320 towards the inner surface 312 of the sleeve 308. A connector seal 323 is disposed between the connector 320 and inner surface 312 of the sleeve 308 to create a gas-tight seal between the connector 320 and the inner surface 312. The connector seal 323 may be a circular, rubber o-ring, for example, located around the connector 320 and adjacent to the flange 324 such that the gas-tight seal is maintained between the connector seal 323 and the inner surface 312 of the sleeve 308 as the sleeve 308 slides from the first position to the second position. In the second position (i.e., the actuated state), as shown in FIGS. 6A-6B, at least a portion of the protrusion 316 will abut the flange 324, thereby preventing the sleeve

308 from sliding out of engagement with the housing 301. In the first position, the fourth end 310 of the sleeve 308 is adjacent the flange 324.

The channel 321 of the connector 320 allows for fluid communication between the sleeve 308 and the gas chamber 306 of the housing 301 in the actuated state whereas the burst seal 322 blocks fluid communication in the pre-actuated state, thereby sealing the gas chamber 306 at the second end 303. Sealing the gas chamber 306 at the first end 302 is an actuator housing 325. As shown in FIGS. 5B/6B, the actuator housing 325 may be welded to the housing 301 at the first end 302. The actuator housing 325 comprises a channel 327 and a burst seal 328 which prevents fluid communication between the channel 327 and the gas chamber 306 in the pre-actuated state. An actuator 326 is coupled to the actuator housing 325 and is in fluid communication with the channel 327. The actuator 326 may be an initiator, or other micro gas generator known in the pyrotechnic arts. The actuator housing 325 is preferably made from stainless steel, however other materials may be used insofar as they provide the appropriate characteristics for a given use case, such as carbon steel, aluminum, or high strength plastics. The actuator housing 325 may be formed a machining process or stamping process, or any other appropriate process as known in the art.

Upon actuation of the vehicle hood lifter and airbag assembly 300, the actuator 326 produces gas and heat in the channel 327 which rapidly increases the pressure in the channel 327, resulting in the breaking of the burst seal 328. Once the burst seal 328 is broken, the movement of the high-pressure gas from the channel 327 into the gas chamber 306 generates a shockwave 329 that travels through the pressurized gas 307 from the first end 302 of the housing 301 to the burst seal 322 of the connector 320 in the direction E. The shockwave 329 breaks the burst seal 322, allowing the pressurized gas 307 to flow from the gas chamber 306 through the channel 321 of the connector 320 and into the sleeve 308. The pressurized gas 307 pushes against the pushing surface 318 to move the sleeve 308 the first position (as shown in FIGS. 5A-5B) to the second position (as shown in FIGS. 6A-6B). Burst seals 322 and 328 may be thin disks of metal or other type of membrane capable of breaking at specified pressures as needed.

Figure 7A:
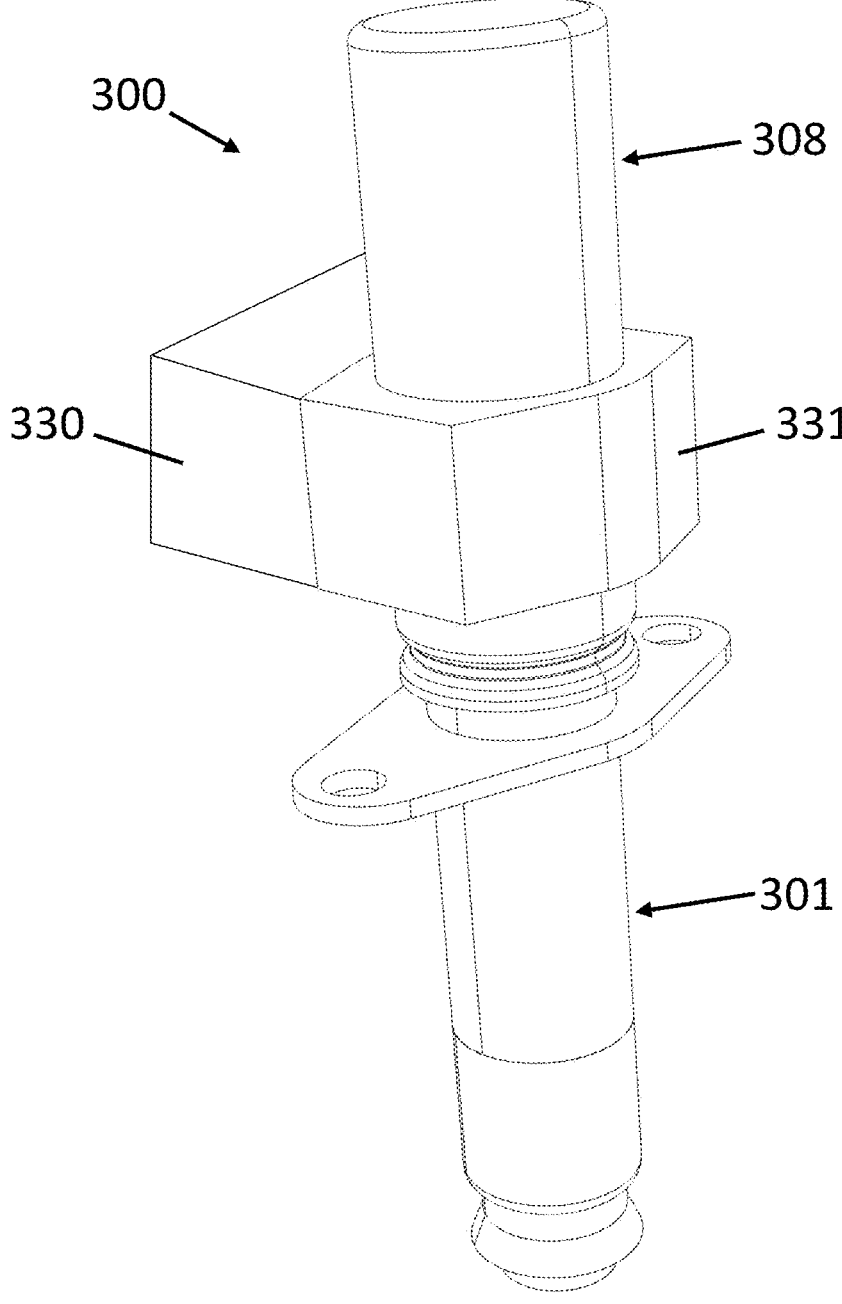
FIG. 7A is a perspective view of the vehicle hood lifter and airbag assembly of FIG. 5A with an airbag in a pre-actuated state.
Figure 7B:
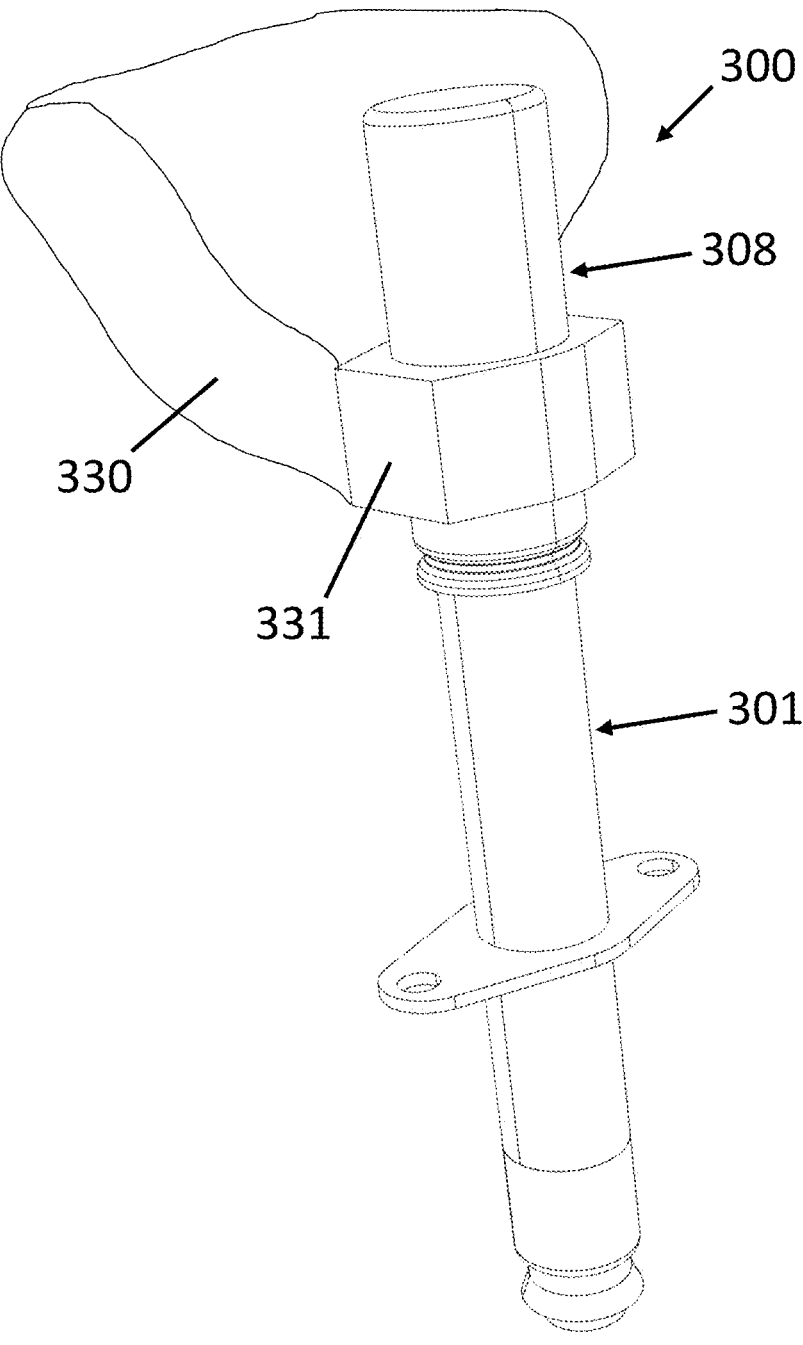
FIG. 7B is a perspective view of the vehicle hood lifter and airbag assembly of FIG. 7A in an actuated state.

Referring now to FIGS. 7A-7B, an airbag 330 is coupled to the outer surface 313 of the sleeve 308 adjacent the gas exit orifices 314. In the first position, the gas exit orifices 314 will be located between the protrusion 316 and the connector seal 323. As the sleeve 308 moves (i.e., slides) from the first position to the second position, the gas exit orifices 314 will pass by the connector seal 323 such that the connector seal 323 is located between the protrusion 316 and the gas exit orifices 314. At this point, the pressurized gas 307 exits the assembly 300 through the gas exit orifices 314 and flows into the airbag 330, thereby inflating it.

A diffuser 331 may be used which defines a gas diffusing channel 332. The diffuser 331 may be coupled to the outer surface 313 of the sleeve 308 between the outer surface 313 and the airbag 330. The diffuser 331 is preferably made from stainless steel, however other materials may be used insofar as they provide the appropriate characteristics for a given use case, such as carbon steel, aluminum, or high strength plastics. The diffuser 331 may be formed by a machining process or any other appropriate process as known in the art. The diffuser 331 may be at least partially disposed within the airbag 330. The gas diffusing channel 332 is designed to direct the pressurized gas 307 exiting the gas exit orifices 314 into the airbag 330 in the preferred deployment direction. For example, as shown in FIGS. 7A-7B, the airbag 330 may be folded or otherwise packaged substantially on one side of the sleeve 308, such that is deploys away from the sleeve 308 when the assembly 300 is actuated.

A mounting bracket 333 is coupled to the outer surface 305 of the housing 301 such that the entire assembly 300 may be mounted to a vehicle. Mounting bracket 333 may include fastener openings 334 to facilitate mounting to a vehicle via a fastener (not shown, e.g., nut and bolt). The mounting bracket 333 is preferably made from stainless steel, however other materials may be used insofar as they provide the appropriate characteristics for a given use case, such as carbon steel, aluminum, or high strength plastics. The mounting bracket 333 may be formed by a stamping process or any other appropriate process as known in the art.

Figure 8:
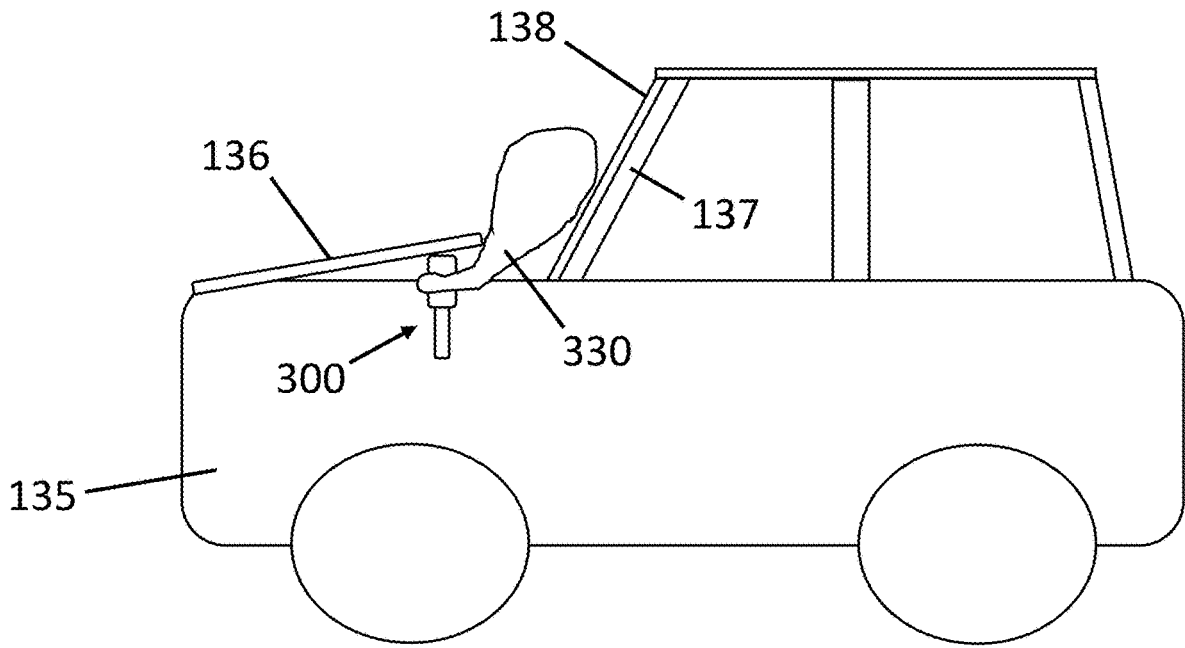
FIG. 8 is a side view of an automobile showing the vehicle hood lifter and airbag assembly in an actuated state.

Referring now to FIG. 8, the vehicle hood lifter and airbag assembly 300 is installed within the engine compartment of the vehicle 135 such that, in the actuated state, the sleeve 308 pushes against the hood 136 to raise the hood 136 as the sleeve 308 moves from the first position to the second position. The sleeve 308 may comprise a striker 319 that impacts the hood 136 as the sleeve 308 pushes against the hood. In the FIGURES, the striker 319 is shown as an end surface of the sleeve 308 at the fourth end 310, however the striker 319 may be a separate component coupled to the fourth end 310 (e.g., a dampening member such as an elastic material). The airbag 330 then deploys to a position adjacent the A-pillar 137 and/or the windshield 138.

What is claimed is:

1. A vehicle hood lifter and airbag assembly comprising:
    a housing comprising a first end, a second end, and a wall extending from the first end to the second end, wherein the wall comprises an inner surface and an outer surface and defines a gas exit orifice, the gas exit orifice extending from the inner surface to the outer surface;
    a piston assembly slidably engaged with the inner surface, the piston assembly comprising a piston and a piston rod;
    a pressurized gas disposed within a gas chamber; and
    an airbag coupled to the outer surface;
    wherein, prior to actuation of the vehicle hood lifter and airbag assembly, the gas exit orifice is disposed between the second end and the piston;
    wherein, upon actuation of the vehicle hood lifter and airbag assembly, the pressurized gas is released from the gas chamber causing the piston to move from adjacent the first end to adjacent the second end; and
    wherein the pressurized gas exits the housing through the gas exit orifice and flows into the airbag when the piston is between the second end and the gas exit orifice.

2. The vehicle hood lifter and airbag assembly of claim 1, wherein the piston and the piston rod are separately formed and coupled together.

3. The vehicle hood lifter and airbag assembly of claim 1, wherein the piston rod defines the gas chamber.

4. The vehicle hood lifter and airbag assembly of claim 3, further comprising an actuator coupled to the first end, wherein the piston defines a piston channel extending from a first end of the piston to a second end of the piston, the piston channel allowing fluid communication between the gas chamber and an actuation chamber disposed between the first end of the piston and the actuator.

5. The vehicle hood lifter and airbag assembly of claim 4, wherein a burst seal prevents fluid communication between the gas chamber and the actuation chamber prior to actuation of the vehicle hood lifter and airbag assembly.

6. The vehicle hood lifter and airbag assembly of claim 5, wherein the burst seal is coupled to the piston adjacent the second end of the piston.

7. The vehicle hood lifter and airbag assembly of claim 5, wherein, upon actuation of the vehicle hood lifter and airbag assembly, the actuator breaks the burst seal causing the pressurized gas to exit the gas chamber through the piston channel and enter the actuation chamber thereby causing the piston to move from adjacent the first end of the housing to adjacent the second end of the housing.

8. The vehicle hood lifter and airbag assembly of claim 7, further comprising a diffuser disposed at least partially within the airbag, wherein the pressurized gas flows through the diffuser after exiting the housing and prior to flowing into the airbag.

9. The vehicle hood lifter and airbag assembly of claim 1, wherein the vehicle hood lifter and airbag assembly is coupled to a vehicle, wherein the piston rod pushes against a hood of the vehicle to raise the hood as the piston moves from adjacent the first end to adjacent the second end.

10. The vehicle hood lifter and airbag assembly of claim 9, wherein the airbag deploys to a position adjacent an A-pillar of the vehicle and/or a windshield of the vehicle.

11. The vehicle hood lifter and airbag assembly of claim 1, wherein the housing is a first housing and the vehicle hood lifter and airbag assembly further comprises a second housing, wherein the second housing comprises a first end and a second end, wherein the second end of the second housing is coupled to the first end of the first housing, wherein the second housing defines the gas chamber.

12. The vehicle hood lifter and airbag assembly of claim 11, wherein the piston and the piston rod are integrally formed together.

13. The vehicle hood lifter and airbag assembly of claim 11, further comprising a connector disposed between the second housing and the first housing and coupling the second housing to the first housing, the connector comprising a channel and a burst seal.

14. The vehicle hood lifter and airbag assembly of claim 13, wherein the channel of the connector is in fluid communication with the first housing and the burst seal prevents fluid communication between the channel and the gas chamber prior to actuation of the vehicle hood lifter and airbag assembly.

15. The vehicle hood lifter and airbag assembly of claim 14, further comprising an actuator coupled to the first end of the second housing, wherein, upon actuation of the vehicle hood lifter and airbag assembly, the actuator generates a shockwave that travels through the pressurized gas from the first end of the second housing to the burst seal of the connector and that breaks the burst seal allowing the pressurized gas to flow from the gas chamber through the channel of the connector and into the first housing.

16. The vehicle hood lifter and airbag assembly of claim 15, further comprising an actuator housing coupled to the first end of the second housing, wherein the actuator is coupled to the actuator housing.

17. The vehicle hood lifter and airbag assembly of claim 16, wherein the actuator housing comprises a channel and a burst seal, wherein the burst seal prevents fluid communication between the gas chamber and the channel of the actuator housing prior to actuation of the vehicle hood lifter and airbag assembly.

18. The vehicle hood lifter and airbag assembly of claim 17, wherein, upon actuation of the vehicle hood lifter and airbag assembly, the actuator breaks the burst seal of the actuator housing.

19. The vehicle hood lifter and airbag assembly of claim 11, wherein the vehicle hood lifter and airbag assembly is coupled to a vehicle, wherein the piston pushes against a hood of the vehicle to raise the hood as the piston moves from adjacent the first end of the first housing to adjacent the second end of the first housing.

20. The vehicle hood lifter and airbag assembly of claim 19, wherein the airbag deploys to a position adjacent an A-pillar of the vehicle and/or a windshield of the vehicle.

* * * * *